(12) United States Patent
Dedering

(10) Patent No.: US 10,876,443 B2
(45) Date of Patent: Dec. 29, 2020

(54) FILTER DEVICE FOR AN OIL FILTER

(71) Applicant: IBS FILTRAN KUNSTSTOFF-/METALLERZEUGNISSE GMBH, Morsbach (DE)

(72) Inventor: Michael Dedering, Morsbach (DE)

(73) Assignee: IBS FILTRAN KUNSTSTOFF-/METALLERZEUGNISSE GMBH, Morsbach (DE)

( * ) Notice: Subject to any disclaimer, the term of this patent is extended or adjusted under 35 U.S.C. 154(b) by 321 days.

(21) Appl. No.: 15/762,848

(22) PCT Filed: Oct. 17, 2016

(86) PCT No.: PCT/EP2016/074882
§ 371 (c)(1),
(2) Date: Mar. 23, 2018

(87) PCT Pub. No.: WO2017/067883
PCT Pub. Date: Apr. 27, 2017

(65) Prior Publication Data
US 2018/0291780 A1 Oct. 11, 2018

(30) Foreign Application Priority Data
Oct. 20, 2015 (DE) .................. 10 2015 220 433

(51) Int. Cl.
*F01M 11/03* (2006.01)
*B01D 29/58* (2006.01)
(Continued)

(52) U.S. Cl.
CPC .............. *F01M 11/03* (2013.01); *B01D 29/01* (2013.01); *B01D 29/58* (2013.01); *F01M 1/10* (2013.01);
(Continued)

(58) Field of Classification Search
CPC .......... B01D 2201/18; B01D 2201/182; B01D 2201/184; B01D 2201/188
See application file for complete search history.

(56) References Cited

U.S. PATENT DOCUMENTS 2,696,914 A * 12/1954 Conley ................. B01D 25/26
210/492
3,370,712 A * 2/1968 Smith .................... B01D 29/23
210/457

(Continued)

FOREIGN PATENT DOCUMENTS

CN 204182227 3/2015
DE 683132 10/1939
(Continued)

OTHER PUBLICATIONS

International Search Report from corresponding PCT Appln. No. PCT/EP2016/074882 dated Jan. 10, 2017. English translation attached.
(Continued)

*Primary Examiner* — Benjamin M Kurtz
(74) *Attorney, Agent, or Firm* — Grossman, Tucker, Perreault & Pfleger, PLLC

(57) ABSTRACT

The present invention relates to a filter device for filtration of oil, comprising a first filtration layer, a second filtration layer, and a frame element, wherein—the frame element is arranged in a sandwich-like manner between the first filtration layer and the second filtration layer, and wherein—the frame element has a multitude of passage orifices, such that a number of intermediate chambers corresponding to the multitude of passage orifices is formed between the first filtration layer and the second filtration layer, wherein the filter device is characterized in that the frame element comprises an oil-permeable filter medium, by means of which filtration of the oil passing therethrough is effected.

15 Claims, 1 Drawing Sheet

(51) Int. Cl.
 B01D 29/01 (2006.01)
 F01M 1/10 (2006.01)
(52) U.S. Cl.
 CPC ............... *B01D 2201/0415* (2013.01); *B01D 2201/188* (2013.01)

(56) References Cited

U.S. PATENT DOCUMENTS

| | | | | |
|---|---|---|---|---|
| 5,993,605 | A | * | 11/1999 | Dadea ................... B01D 39/08 162/298 |
| 9,808,742 | B2 | | 11/2017 | Dedering |
| 10,012,118 | B2 | | 7/2018 | Khalil et al. |
| 2010/0147755 | A1 | | 6/2010 | Dedering |
| 2014/0284268 | A1 | | 9/2014 | Volkmer |
| 2016/0003115 | A1 | * | 1/2016 | van Uffelen ........... B01D 39/18 210/435 |

FOREIGN PATENT DOCUMENTS

| | | |
|---|---|---|
| EP | 2133130 | 12/2009 |
| JP | 2004-223405 | 8/2004 |
| JP | 2013-96412 | 5/2013 |
| JP | 2016-131972 | 7/2016 |
| WO | 99/12634 | 3/1999 |
| WO | 2013/083705 | 6/2013 |

OTHER PUBLICATIONS

English translation of International Preliminary Report on Patentability from corresponding PCT Appln. No. PCT/EP2016/074882 dated Apr. 26, 2018.

Office Action from related Chinese Appln. No. 201680060737.X, dated Oct. 15, 2019. English translation attached.

* cited by examiner

FILTER DEVICE FOR AN OIL FILTER

FIELD

The present invention relates to a filter device for filtering oil. Furthermore, the present invention relates to a suction filter and a pressure filter having a corresponding filter device.

BACKGROUND

Filter devices which are known from the prior art and which are also generally referred to as filter media are used for filtering oil, for example, in a suction filter for motor vehicles, trucks and/or motorbikes.

In filter devices or filter media known from the prior art, there is the problem that during the use of efficient filter media, in particular at low temperatures, for example, in the event of a cold start, considerable pressure losses are present. The reason for this disadvantage is the high viscosity of the oil at low temperatures. Deep-filtration media, which may have an acceptable pressure loss with a high dirt absorption capacity, do not have a high filtration efficiency. Fabrics for filtration purposes known from the prior art have only a low dirt absorption capacity and further do not reach a high level of efficiency. Particularly in the region of the suction filters in which at a maximum a reduced pressure of 1 bar can be achieved, the above problems prevent efficient and long-lasting filtration results.

EP 2 133 130 A1 discloses a filter medium for an oil filter in which a frame element is arranged between a first and a second filtration layer so that intermediate chambers are formed between the first filtration layer and the second filtration layer. The first filtration layer comprises in this instance an open filter medium and the second filtration layer comprises a dense filter medium. The second filtration layer consequently comprises a more dense filter medium than the first filtration layer. The filter medium known from EP 2 133 130 A1 has a lower pressure loss at low flow speeds and high viscosities of the oil which is intended to be filtered. Furthermore, the filter medium has a high efficiency at low viscosities of the oil which is intended to be filtered.

The disadvantage with the filter medium known from EP 2 133 130 A1 is in contrast that, as a result of the rigid construction of the frame element, the frame element has to be adapted to a geometry of a suction filter in which the filter medium is intended to be installed. This is because the frame element is formed from a rigid plastics material so that the spacing between the first filtration layer and the second filtration layer always remains ensured. Consequently, for different suction filters each having a different structure and a different geometry, a large number of frame elements, first and second filtration layers have to be kept. Another disadvantage of the filter medium known from EP 2 133 130 A1 is that there are formed in the contact region of the filter medium with the first filtration layer and the second filtration layer so-called dead surfaces as a result of which no oil can pass through the filter medium since the frame element itself is not constructed to be permeable with respect to oil. Consequently, the active face which is active during filtration both of the first filtration layer and of the second filtration layer is reduced by the contact surface of the frame element on the first filtration layer and the second filtration layer.

SUMMARY

An object of the present invention is consequently to provide an improved filter device which, with consistently high or even improved filtration power, has an increased structural flexibility and smaller dimensions.

More specifically, the problem addressed by the present invention is solved with a filter device for filtering oil which comprises a first filtration layer, a second filtration layer and a frame element, wherein the frame element is arranged in a sandwich-like manner between the first filtration layer and the second filtration layer and wherein the frame element has a large number of through-openings so that a number of intermediate chambers corresponding to the large number of through-openings is formed between the first filtration layer and the second filtration layer. The filter device according to the invention is characterized in that the frame element comprises an oil-permeable filter medium by means of which a filtration of the oil which passes through it is carried out.

The filter device according to the invention, which can also be referred to as a filter medium, affords the advantage that, as a result of the flexible construction of the frame element, it generally has increased flexibility so that the filter device can adapt to specific geometric properties of a suction filter in which the filter medium is, for example, installed. Furthermore, the filter device according to the invention affords the advantage that the entire surface both of the first filtration layer and of the second filtration layer can be used for filtering oil since the frame element does not inhibit a passage or throughflow of the oil.

Consequently, the cross-section dimensions of the filter device according to the invention can be decreased. Furthermore, the filter device according to the invention affords the advantage that the overall filter efficiency is increased since the frame element itself acts as a filtration layer so that per surface unit of the filter device an increased filter volume is provided, whereby the filter efficiency of the filter device according to the invention is increased.

Since the differential pressure in the second filtration layer is propagated as a result of the filter device which is completely flowed through and the porous frame element to the level of the first filtration layer, the filter device according to the invention affords the advantage of a reduced differential pressure. There is thereby always produced a higher throughflow at the contact locations of the frame element than at the boundary region of the filtration layer in the direction toward the intermediate chambers. This is a fundamental difference with respect to frame elements of a solid material, where the flow at the contact locations of the frame element to the porous filter media of the first and second filtration layer is significantly lower. Thus, with the filter device according to the invention, for example, in spite of large inlet openings in the first filtration layer, an increased flow of the oil which is intended to be filtered can be produced through the oil-permeable filter medium of the frame element.

The filter device according to the invention is in particular constructed for oil circuits of gear mechanisms and internal combustion engines. The frame element may also be referred to as a spacer element. The oil-permeable filter medium of the frame element preferably comprises a filter fleece. In a further preferred manner, the frame element exclusively comprises the oil-permeable filter medium, preferably exclusively of a filter fleece. A through-opening of the frame element is intended to be understood to be such a material recess of the oil-permeable filter medium that in the region of the through-opening no filter medium/filter material is arranged/provided between the first filtration layer and the second filtration layer.

Preferably, the filter device is constructed in such a manner that the respective intermediate chambers are each limited at the end face directly by the first filtration later and the second filtration layer and at the edge side directly by a lateral edge of the through-openings of the frame element.

As a result of a corresponding construction of the filter device, there is produced an increased structural flexibility of the filter device so that it can be adapted in an improved manner to the geometric conditions of a suction filter in which the filter device is intended to be installed.

In a further preferred manner, the filter device is constructed in such a manner that a total of the cross-sectional surface-areas of the through-openings of the frame element corresponds to at least a tenth of the total surface-area of the frame element.

In a further preferred manner, the total of the cross-sectional surface-areas of the through-openings of the frame element is more than 1% of the total surface-area of the frame element. In a further preferred manner, the total of the cross-sectional surface-areas of the through-openings of the frame element is more than 20% of the total surface-area of the frame element. In a further preferred manner, the total of the cross-sectional surface-areas of the through-openings of the frame element is more than 30% of the total surface-area of the frame element. In a further preferred manner, the total of the cross-sectional surface-areas of the through-openings of the frame element is more than 40% of the total surface-area of the frame element. In a further preferred manner, the total of the cross-sectional surface-areas of the through-openings of the frame element is more than 50% of the total surface-area of the frame element. In a further preferred manner, the total of the cross-sectional surface-areas of the through-openings of the frame element is more than 60% of the total surface-area of the frame element. In a further preferred manner, the total of the cross-sectional surface-areas of the through-openings of the frame element is more than 70% of the total surface-area of the frame element. In a further preferred manner, the total of the cross-sectional surface-areas of the through-openings of the frame element is more than 80% of the total surface-area of the frame element. In a further preferred manner, the total of the cross-sectional surface-areas of the through-openings of the frame element is more than 90% of the total surface-area of the frame element. In a further preferred manner, the total of the cross-sectional surface-areas of the through-openings of the frame element is more than 99% of the total surface-area of the frame element In a further preferred manner, the filter device is constructed in such a manner that the first filtration layer has a large number of inlet openings which each open in one of the intermediate chambers of the filter device.

In a further preferred manner, the large number of inlet openings of the first filtration layer preferably corresponds to the large number of through-openings of the frame element. Consequently, the inlet openings of the first filtration layer open in the through-openings of the frame element and consequently in the intermediate chambers. In a plan view of the filtering device, the respective inlet openings of the first filtration layer are surrounded by the respective through-openings of the frame element. Preferably, in a plan view of the filter device, the respective inlet openings of the first filtration layer are at least partially surrounded by the respective through-openings of the frame element. Consequently, the inlet openings can be partially covered by the oil-permeable filter medium of the frame element.

As a result of a corresponding construction of the filter device, the use of the filter device is enabled over a extensive viscosity range of the oil which is intended to be filtered since in particular in the case of high viscosities, as is, for example, the case at low temperatures, the oil does not have to pass completely through the first filtration layer.

In a further preferred manner, the filter device is constructed in such a manner that the respective through-openings have a circular cross-section.

A correspondingly constructed filter device has an increased stability, wherein at the same time it remains ensured that a spacing between the first filtration layer and the second filtration layer remains ensured in a reliable manner by the correspondingly constructed frame element. Alternatively, the through-openings may also have a square or rectangular or hexagonal or octagonal or any polygonal cross-sectional shape. Limitations with regard to the geometric configuration of the through-openings of the frame element do not exist in this regard.

In a further preferred manner, the filter device is constructed in such a manner that the first filtration layer comprises a fine filter medium and the second filtration layer comprises a coarse filter medium.

The coarse filter medium has a first mean pore size and the fine filter medium has a second mean pore size, wherein the first mean pore size is greater than the second mean pore size. A coarse filter medium is intended with regard to a fine filter medium to be understood to be a filter medium which has larger mean pore sizes so that the coarse filter medium is constructed for filtering particles which have a larger diameter than the particles which are filtered out by the fine filter medium. In other words, using the fine filter medium, there can be filtered particles which have a smaller diameter/a smaller extent than particles which can be filtered out by means of the coarse filter medium.

In a further preferred manner, the filter device is constructed in such a manner that the frame element comprises exclusively the oil-permeable filter medium. A correspondingly constructed filter device has a considerably simplified structure and consequently significantly reduced production costs. Furthermore, a correspondingly constructed filter device is particularly flexible and can readily be adapted to geometric conditions of a suction filter in which the filter device is intended to be installed.

In a further preferred manner, the filter device is constructed in such a manner that the oil-permeable filter medium of the frame element has a mean pore size which is greater than or equal to a mean pore size of a filter medium of the first filtration layer, and/or that the oil-permeable filter medium of the frame element has a greater permeability than the filter medium of the first filtration layer.

In a further preferred manner, the filter device is constructed in such a manner that the oil-permeable filter medium of the frame element has a mean pore size which is less than or equal to a mean pore size of a filter medium of the first filtration layer and/or that the oil-permeable filter medium of the frame element has a lower permeability than the filter medium of the first filtration layer.

In a further preferred manner, the filter device is constructed in such a manner that the oil-permeable filter medium of the frame element has a mean pore size which is greater than or equal to a mean pore size of a filter medium of the second filtration layer and/or that the oil-permeable filter medium of the frame element has a greater permeability than the filter medium of the second filtration layer.

In a further preferred manner, the filter device is constructed in such a manner that the oil-permeable filter medium of the frame element has a mean pore size which is less than or equal to a mean pore size of a filter medium of the second filtration layer and/or that the oil-permeable filter medium of the frame element has a lower permeability than the filter medium of the second filtration layer.

In a further preferred manner, the filter device is constructed in such a manner that the oil-permeable filter medium of the frame element has a mean pore size which is less than or equal to the mean pore size of a filter medium of the second filtration layer and greater than or equal to the mean pore size of a filter medium of the first filtration layer.

The filter device according to the invention is intended to be understood in such a manner that both the first filtration layer and the second filtration layer may comprise more than one planar filter medium so that the filtration properties of the filter device can be adapted to different application purposes. For example, the first filtration layer may comprise two, three or more planar filtration media. Furthermore, the second filtration layer may comprise, for example, two, three or more planar filtration media.

Furthermore, the present invention is intended to be understood in such a manner that the first filtration layer may be constructed as a folded filtration layer so that the first filtration layer then has in cross-section a zigzag shape or an undulating shape. Furthermore, the first filtration layer may then also comprise a plurality of, for example, two, four or more than four filter media which are folded in each case. Furthermore, the second filtration layer may be constructed as a folded filtration layer so that the second filtration layer then has in cross-section a zigzag shape or an undulating shape. Furthermore, the second filtration layer may also then comprise a plurality of, for example, two, four or more than four folded filter media. Furthermore, the frame element may be constructed as a folded frame element so that the frame element then has in cross-section a zigzag shape or an undulating shape. Furthermore, the frame element may also then comprise a plurality of, for example, two, four or more than four folded oil-permeable filter media.

BRIEF DESCRIPTION OF THE DRAWINGS

Other advantages, details and features of the invention will be appreciated below from the explained embodiment. In detail in the drawings.

DETAILED DESCRIPTION

Figure 1:
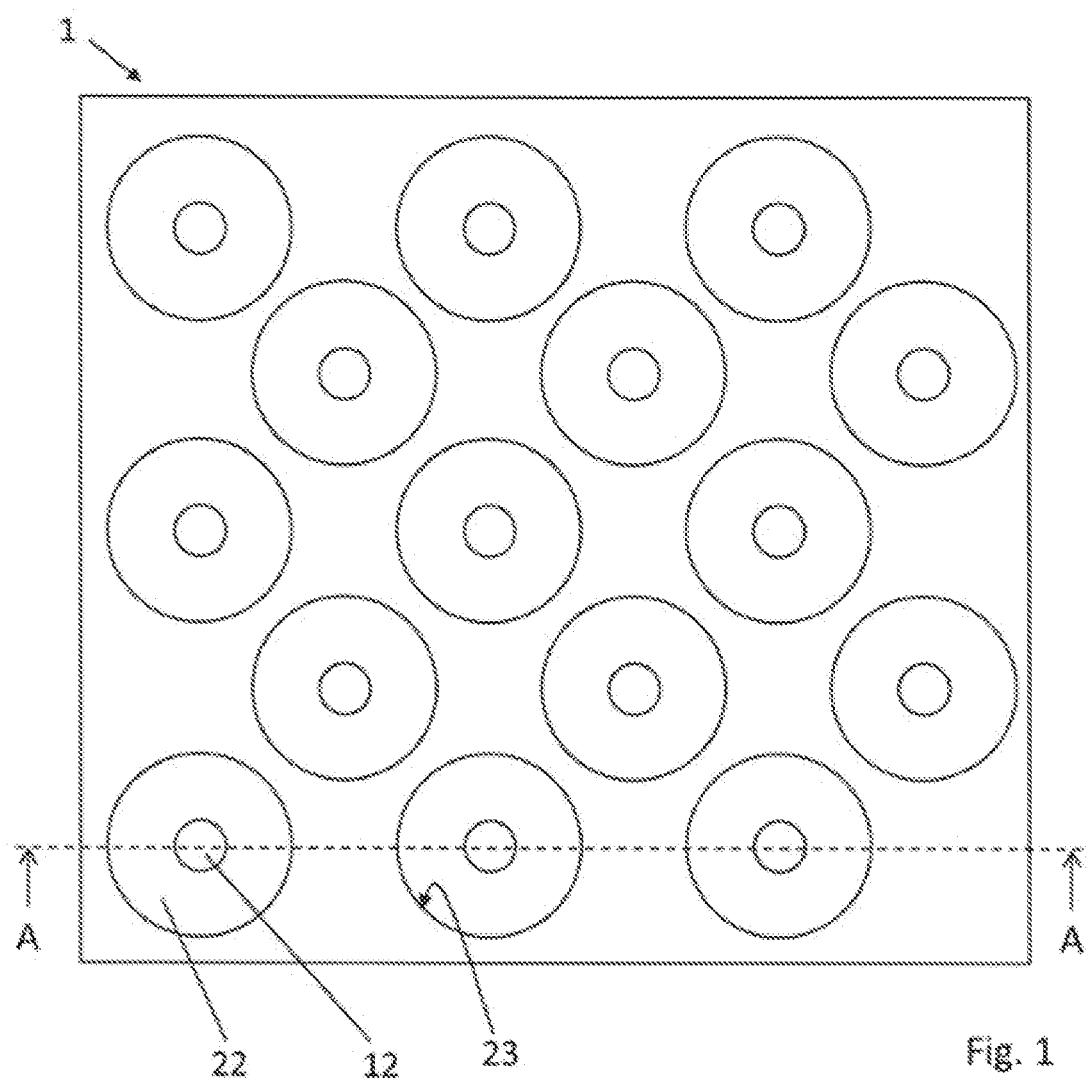
FIG. 1: is a plan view of the filter device according to the invention without the second filtration layer.

In the description which now follows, the same reference numerals refer to the same components or same features so that a description which is carried out in relation to a Figure with respect to a component also applies to the other Figures so that a repeated description is avoided.

Figure 2:
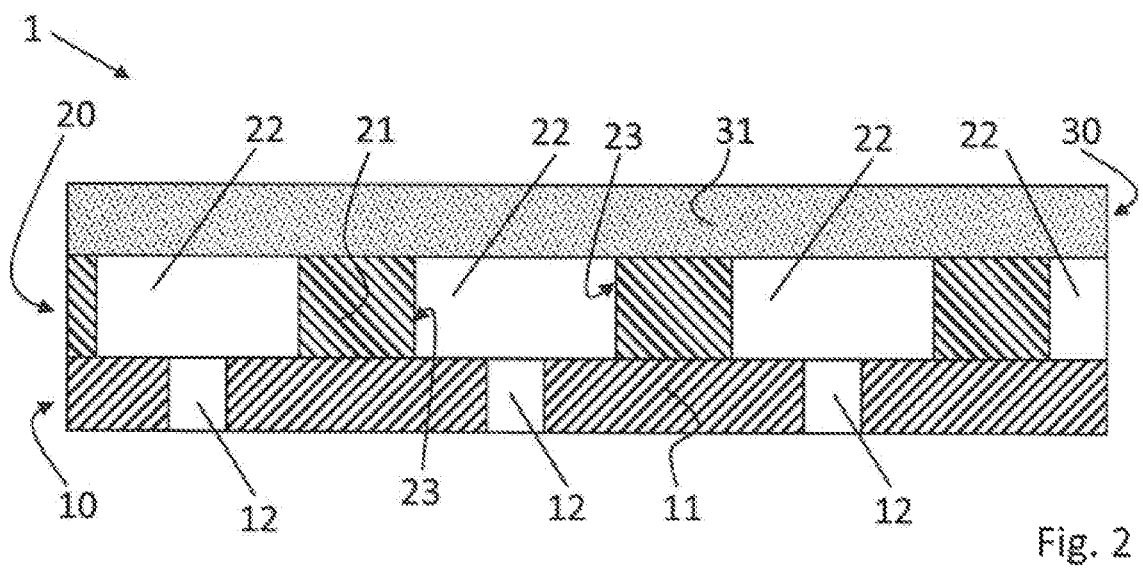
FIG. 2: is a schematic sectioned illustration of the filter device illustrated in FIG. 1 along the plane of section A-A with the second filtration layer.

FIG. 1 is a plan view of a filter device 1 according to the invention which can also be referred to as a filter medium 1, and FIG. 2 is a schematic sectioned illustration of the filter device 1 illustrated in FIG. 1 along the plane of section A-A. In this instance, it should be noted that in FIG. 1 a second filtration layer 30 is not illustrated so that from FIG. 1 only a plan view of a frame element 20 and a first filtration layer 10 of the filter device 1 therebelow can be seen, whereas in FIG. 2 the second filtration layer 30 which is arranged on the frame element 20 can also be seen.

As already mentioned, the filter device 1 according to the invention for filtering oil comprises the first filtration layer 10, the frame element 20 which is arranged on the first filtration layer 10 and the second filtration layer 30 which is arranged on the frame element 20. Consequently, the frame element 20 is arranged in a sandwich-like manner between the first filtration layer 10 and the second filtration layer 30. The frame element 20 comprises an oil-permeable filter medium 21 by means of which a filtration of the oil which is passing through the oil-permeable filter medium 21 is carried out. The frame element 20 can also be referred to as a spacer element 20.

FIGS. 1 and 2 show that the frame element 20 has a large number of through-openings 22 so that between the first filtration layer 10 and the second filtration layer 30 a number of intermediate chambers 22 which corresponds to the number of through-openings 22 is formed. In this instance, the respective intermediate chambers 22 are each delimited at the end face directly by the first filtration layer 10 and the second filtration layer 30. At the edge side, the respective intermediate chambers 32 are delimited directly by a lateral edge 23 of the through-openings 22 of the frame element 20.

In the embodiment illustrated, the total of the cross-sectional surface-areas of the through-openings 22 of the frame element 20 and consequently the total of the cross-sectional surface-areas of the intermediate chambers 22 of the filter device 1 is approximately from 50% to 60% of the total surface-area of the frame element 20. However, the present invention is not limited to a corresponding percentage of the total of the cross-sectional surface-areas of the through-openings 22 relative to the total surface-area of the frame element 20.

The Figures further show that the first filtration layer 10 has a large number of inlet openings 12 which each open in one of the intermediate chambers 22 of the filter device 1. When establishing a reduced pressure in a suction filter which is not illustrated in the Figures and in which the filter device 1 is installed, oil passes via the inlet openings 12 into the intermediate chambers 22 of the filter device 1. As a result of the reduced pressure, the oil is drawn from the intermediate chambers 22 through a filter medium 31 of the second filtration layer 30. The oil also passes of course via a filter medium 11 of the first filtration layer 10 both into the intermediate chambers 22 and into an oil-permeable filter medium 21 of the frame element 20, whereupon the oil as a result of the existing reduced pressure of the intermediate chambers 22 and the oil-permeable filter medium 21 is drawn through the filter medium 31, which may be constructed as a fine filter medium 31.

The filter medium 11 of the first filtration layer 10 may, for example, be constructed as a coarse filter medium 11. The filter medium 31 of the second filtration layer 30 may, for example, be constructed as a fine filter medium 31 so that a mean pore size of the fine filter medium 31 is less than a mean pore size of the coarse filter medium 11. The oil-permeable filter medium 21, from which the frame element 20 is formed, may have a mean pore size which is less than the mean pore size of the coarse filter medium 11 and greater than a mean pore size of the fine filter medium 31. Furthermore, it is also possible for a mean pore size of the oil-permeable filter medium 21 of the frame element 20 to be greater than or equal to a mean pore size of the coarse filter medium 11 of the first filtration layer 10. Furthermore, it is also possible for a mean pore size of the oil-permeable filter medium 21 of the frame element 20 to be less than a mean pore size of the fine filter medium 31 of the second filtration layer. Limitations with respect to the size relationships of the mean pore size of the oil-permeable filter medium 21 with respect to the mean pore sizes of the coarse filter medium 11 and the fine filter medium 31 do not exist in this regard.

FIG. 1 further shows that the respective through-openings 22 and consequently the respective intermediate chambers 22 have a circular cross-section. However, the present invention is not limited to a corresponding cross-sectional geometry of the intermediate chambers 22. The intermediate chambers 22 may, for example, also have a square, a rectangular, a hexagonal, an octagonal or any polygonal cross-section. Limitations with respect to the cross-sectional shape of the intermediate chambers 22 do not exist in this regard.

LIST OF REFERENCE NUMERALS

1 Filter device/Filter medium
10 First filtration layer
11 Filter medium/coarse filter medium (of the first filtration layer)
12 Inlet opening (of the first filtration layer)
20 Frame element/Spacer element
21 Oil-permeable filter medium (of the frame element)
22 Through-opening/Intermediate chamber
23 Lateral edge of the through-opening
30 Second filtration layer
31 Filter medium/Fine filter medium (of the second filtration layer)

The invention claimed is:

1. A filter device for filtering oil, comprising a first filtration layer, a frame element on the first filtration layer, and a second filtration layer on the frame element, wherein:
the first filtration layer comprises a first filter medium and a plurality of inlet openings that extend through an entire thickness of the first filtration layer;
the frame element spaces the first filtration layer and second filtration layer apart from each other, and comprises an oil permeable filter medium and a plurality of intermediate chambers formed by through-openings that extend through an entire thickness of the frame element;
the second filtration layer comprises a second filter medium;
each of the plurality of intermediate chambers comprises a first end face and a second end face and is bounded by at least one lateral edge formed by said oil permeable filter medium;
each of said plurality of inlet openings is at least partially surrounded by the at least one lateral edge of a respective one of the plurality of through-openings; and
when oil is passed through said filter device, a through flow of said oil is higher at contact locations between said frame element and said first filtration layer than a through flow of said oil at a boundary region between said first filtration layer and said intermediate chambers.

2. The filter device as claimed in claim 1, wherein the first end face of each of the plurality of intermediate chambers is delimited by the first filtration layer and the second end face of each of the plurality intermediate chambers is delimited by the second filtration layer.

3. The filter device as claimed in claim 1, wherein a total of the cross-sectional surface-areas of the plurality of through-openings is at least 10% of the total surface-area of the frame element.

4. The filter device as claimed in claim 1, wherein each of the plurality of inlet openings have a circular or polygonal cross section.

5. The filter device as claimed in claim 4, wherein each of the through-openings have a circular cross-section.

6. The filter device as claimed in claim 1, wherein the first filtration layer comprises a fine filter medium and the second filtration layer comprises a coarse filter medium.

7. The filter device as claimed in claim 1, wherein the frame element consists of said oil-permeable filter medium.

8. The filter device as claimed in claim 1, wherein the oil-permeable filter medium of the frame element has a mean pore size which is greater than or equal to a mean pore size of the first filter medium, the oil-permeable filter medium of the frame element has a greater permeability than the second filter medium, or the mean pore size of the oil-permeable filter medium is greater than or equal to the mean pore size of the first filter medium and the permeability of the oil permeable filter medium is greater than the permeability of the second filter medium.

9. The filter device as claimed in claim 1, wherein the oil-permeable filter medium of the frame element has a mean pore size which is less than or equal to a mean pore size of the first filter medium, the oil-permeable filter medium of the frame element has a lower permeability than the first filter medium, or the mean pore size of the oil-permeable filter medium is less than or equal to the mean pore size of the first filter medium, and the permeability of the oil-permeable filter medium is lower than the permeability of the first filter medium.

10. The filter device as claimed in claim 1, wherein the oil-permeable filter medium of the frame element has a mean pore size which is greater than or equal to a mean pore size of the second filter medium, the oil-permeable filter medium of the frame element has a greater permeability than the second filter medium, or the mean pore size of the oil-permeable filter medium is greater than or equal to the mean pore size of the second filter medium, and the permeability of the oil-permeable filter medium is greater than the permeability of the second filter medium.

11. The filter device as claimed in claim 1, wherein the oil-permeable filter medium of the frame element has a mean pore size which is less than or equal to a mean pore size of the second filter medium, the oil-permeable filter medium of the frame element has a lower permeability than the second filter medium, or the mean pore size of the oil-permeable filter medium is less than or equal to the mean pore size of the second filter medium, and the permeability of the oil-permeable filter medium that is less than the permeability of the second filter medium.

12. The filter device as claimed in claim 1, wherein the oil-permeable filter medium of the frame element has a mean pore size which is less than or equal to a mean pore size of the second filter medium and greater than or equal to a mean pore size of the first filter medium.

13. The filter device of claim 1, wherein the oil-permeable filter medium comprises filter fleece.

14. The filter device of claim 7, wherein the oil-permeable filter medium consists of filter fleece.

15. The filter device of claim 3, wherein the total of the cross-sectional surface-areas of the plurality of through-openings is 50 to 60% of the total surface-area of the frame element.

* * * * *